United States Patent
Paprotna et al.

(10) Patent No.: US 6,733,234 B2
(45) Date of Patent: May 11, 2004

(54) BIASED WEAR RESISTANT TURBINE SEAL ASSEMBLY

(75) Inventors: Hubertus E. Paprotna, Winter Springs, FL (US); Michael J. Morrision, Orlando, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 18 days.

(21) Appl. No.: 10/243,654

(22) Filed: Sep. 13, 2002

(65) Prior Publication Data

US 2004/0052637 A1 Mar. 18, 2004

(51) Int. Cl.7 ................................................. F01D 11/00
(52) U.S. Cl. .................... 415/138; 415/191; 415/170.1; 415/173.7; 277/637; 277/643
(58) Field of Search .................. 415/139, 138, 415/191, 135, 170.1, 174.2, 173.7, 175, 230, 231; 277/637, 643, 644, 649, 651, 653, 579, 580

(56) References Cited

U.S. PATENT DOCUMENTS

| 4,063,845 A | 12/1977 | Allen |
|---|---|---|
| 4,477,086 A | 10/1984 | Feder et al. |
| 4,537,024 A | 8/1985 | Grosjean |
| 4,897,021 A | 1/1990 | Chaplin et al. |
| 4,902,198 A | 2/1990 | North |
| 5,080,557 A | 1/1992 | Berger |
| 5,088,888 A | 2/1992 | Bobo |
| 5,104,286 A | 4/1992 | Donlan |
| 5,125,796 A | 6/1992 | Cromer |
| 5,154,577 A | 10/1992 | Kellock et al. |
| 5,158,430 A | 10/1992 | Dixon et al. |
| 5,167,485 A | 12/1992 | Starkweather |
| 5,167,488 A | 12/1992 | Ciokajlo et al. |
| 5,221,096 A | 6/1993 | Heldreth et al. |

(List continued on next page.)

FOREIGN PATENT DOCUMENTS

| EP | 1176343 | 1/2002 |
|---|---|---|
| EP | 1239118 | 9/2002 |
| JP | 10002203 | 1/1998 |

*Primary Examiner*—Edward K. Look
*Assistant Examiner*—J. M. McAleenan

(57) ABSTRACT

A biased, wear resistant seal assembly for sealing gas flow paths in a turbine system includes a planar shim having transverse legs at each end, a flattened leaf spring to urge the shim into sealing contact with the sealing surfaces of the turbine parts, and a shim protection material to avoid wear to the shim on the contact side. The shim protection material can include one or more metal fiber cloth layers secured to the shim, for example, by seam welding to a pair of rails or to the legs of the shim.

18 Claims, 4 Drawing Sheets

U.S. PATENT DOCUMENTS

| | | | |
|---|---|---|---|
| 5,333,995 | A | 8/1994 | Jacobs et al. |
| 5,354,072 | A | 10/1994 | Nicholson |
| 5,531,457 | A | 7/1996 | Tibbott et al. |
| 5,586,773 | A | 12/1996 | Bagepalli et al. |
| 5,624,227 | A | 4/1997 | Farrell |
| 5,627,227 | A | 5/1997 | Suga et al. |
| 5,657,998 | A | 8/1997 | Dinc et al. |
| 5,709,530 | A | 1/1998 | Cahill et al. |
| 5,762,472 | A | 6/1998 | Pizzi et al. |
| 5,797,723 | A | 8/1998 | Frost et al. |
| 5,820,338 | A | 10/1998 | Kasprow et al. |
| 5,823,741 | A | 10/1998 | Predmore et al. |
| 5,865,600 | A | 2/1999 | Mori et al. |
| 5,868,398 | A | 2/1999 | Maier et al. |
| 5,915,697 | A | 6/1999 | Bagepalli et al. |
| 5,927,942 | A | 7/1999 | Stahl et al. |
| 5,934,687 | A | 8/1999 | Bagepalli et al. |
| 5,957,658 | A | 9/1999 | Kasprow et al. |
| 5,975,844 | A | 11/1999 | Milazar et al. |
| 5,988,975 | A | 11/1999 | Pizzi |
| 5,997,247 | A | 12/1999 | Arraitz et al. |
| 6,042,334 | A | 3/2000 | Schilling |
| 6,079,944 | A | 6/2000 | Tomita et al. |
| 6,086,329 | A | 7/2000 | Tomita et al. |
| 6,139,264 | A * | 10/2000 | Schilling ................. 415/174.2 |
| 6,144,656 | A | 11/2000 | Kinnunen et al. |
| 6,162,014 | A | 12/2000 | Bagepalli et al. |
| 6,164,656 | A | 12/2000 | Frost |
| 6,193,240 | B1 | 2/2001 | Johnson et al. |
| 6,199,871 | B1 | 3/2001 | Lampes |
| 6,217,279 | B1 | 4/2001 | Ai et al. |
| 6,237,921 | B1 | 5/2001 | Liotta et al. |
| 6,261,063 | B1 | 7/2001 | Chikami et al. |
| 6,290,459 | B1 | 9/2001 | Correia |
| 6,312,218 | B1 | 11/2001 | Beeck et al. |
| 6,386,825 | B1 | 5/2002 | Burdgick |
| 6,398,499 | B1 | 6/2002 | Simonetti et al. |
| 6,402,466 | B1 | 6/2002 | Burdgick et al. |
| 6,406,256 | B1 | 6/2002 | Marx |
| 6,412,149 | B1 | 7/2002 | Overberg |
| 6,413,042 | B2 | 7/2002 | Correia |
| 6,418,727 | B1 | 7/2002 | Rice et al. |
| 6,431,555 | B1 | 8/2002 | Schroder et al. |
| 6,431,825 | B1 | 8/2002 | McLean |
| 2001/0019695 | A1 | 9/2001 | Correia |

* cited by examiner

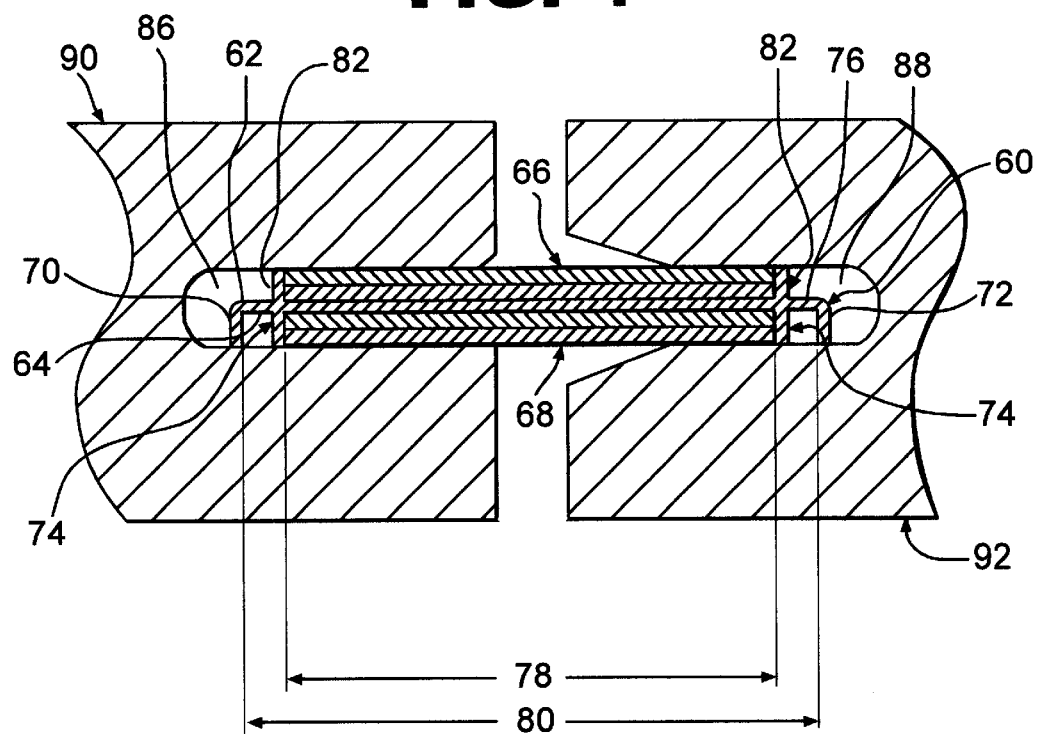
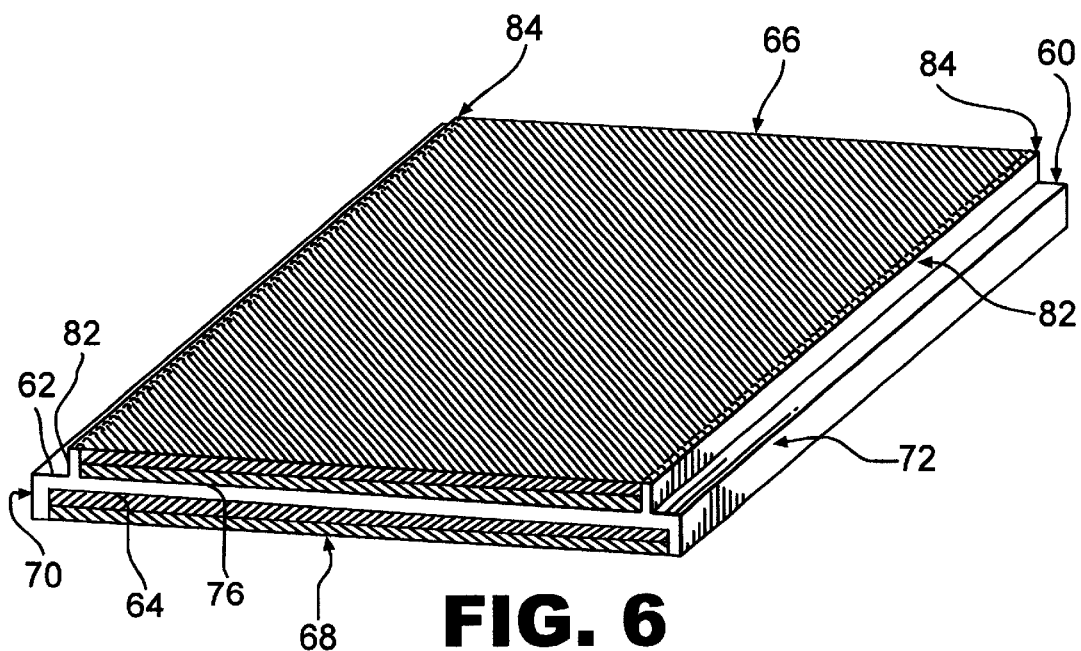

BIASED WEAR RESISTANT TURBINE SEAL ASSEMBLY

CROSS REFERENCE TO RELATED APPLICATIONS (Not Applicable)

STATEMENT REGARDING FEDERALLY SPONSORED RESEARCH (Not Applicable)

FIELD OF THE INVENTION

The present invention relates in general to turbines and, more particularly, to seals for separating gas paths in a turbine.

BACKGROUND OF THE INVENTION

The main gas-flow path in a gas turbine engine commonly includes a gas intake, a compressor, a combustor, a turbine, and a gas outlet. There are also secondary flows that are used to cool the various heated components of the engine. Mixing of these flows and gas leakage in general, from or into the gas path, is detrimental to engine performance and is generally undesirable.

One particular area in which a leakage path occurs is in the spacing between two gas turbine components such as adjacent vanes or ring segments. Sealing off this leakage path is problematic because the seal must be durable enough to last several thousand hours of operation and flexible enough to compensate for assembly misalignment, different engaging surfaces, vibration from operation, and unequal thermal expansion between adjacent components. Conventional seals, such as metal shims, are rigid and do not conform to the various misalignments; consequently, leakage occurs around the shims, which ultimately leads to a decrease in engine performance. Also, vibration and other relative movement of the adjacent components can wear the contact surfaces of the shim and introduce fracturing forces to the shim. Therefore, there is a need for an improved turbine gas-path leakage seal that can conform to various misalignments and that is easy to assemble and install.

SUMMARY OF THE INVENTION

Accordingly, it is an object of the invention to provide a seal for gas flow passages in a turbine that is constructed to provide a reliable seal in a vibrational environment.

It is another object of the invention to provide a turbine seal that is constructed to provide a reliable seal when sealed parts are misaligned due to manufacturing tolerances or operational displacement.

It is a further object of the invention to provide a turbine seal that is wear resistant under increased sealing pressure.

These and other objects of the invention are achieved by a turbine seal having a sealing shim having a top surface and a bottom surface, a first end portion, a second end portion, and a generally planar bridge portion connecting said first end portion and said second end portion. The first and second end portions extend downward at approximately 90 degrees from said bridge portion. At least one spring operatively contacts the bridge portion of said top surface of said sealing shim. The spring is biased against an opposing bearing surface of the sealed turbine parts, and urges the seal into forced contact with the sealing surfaces of the turbine parts. Thus, under operational dynamics, the sealing shim is urged to maintain a sealing contact.

Because this forced sealing contact can increase the wear on the shim, shim protection material is disposed generally between the first and second end portions and substantially adjacent to least a portion of the bridge portion on the opposite side from the spring. The shim protection material can be secured to the shim according to a variety of techniques of the invention. The shim protection material can include one or more layers of cloth made of metal fibers or the like. The alignment of fibers in each cloth are preferably angled relative to the longitudinal dimension of the shim.

The shim protection material can substantially abut the first and second end portions and be secured to the first and second end portions by seam welds. Alternatively, a pair of rails can extend downward from the bottom surface of the shim bridge portion. The shim protection material can extend between and substantially adjacent to said pair of rails and be secured to said pair of rails by seam welds.

The seal assembly according to the invention can also include a leaf spring having a curved cross-sectional profile. The profile defines a vertex portion extending to opposing base portions. The profile has a substantially flat region over at least half the cross sectional length and curving to the base portions.

The seal assembly can be used to seal various gas flow passages in a turbine environment, including, for example, adjacent turbine vanes, blades or turbine ring segments.

BRIEF DESCRIPTION OF THE DRAWINGS

FIG. 4 is a cross-sectional view of a fourth embodiment of the seal assembly of the present invention.

FIG. 6 is a perspective view of a sixth embodiment of the seal assembly of the present invention.

DETAILED DESCRIPTION OF EMBODIMENTS OF THE INVENTION

Figure 1:
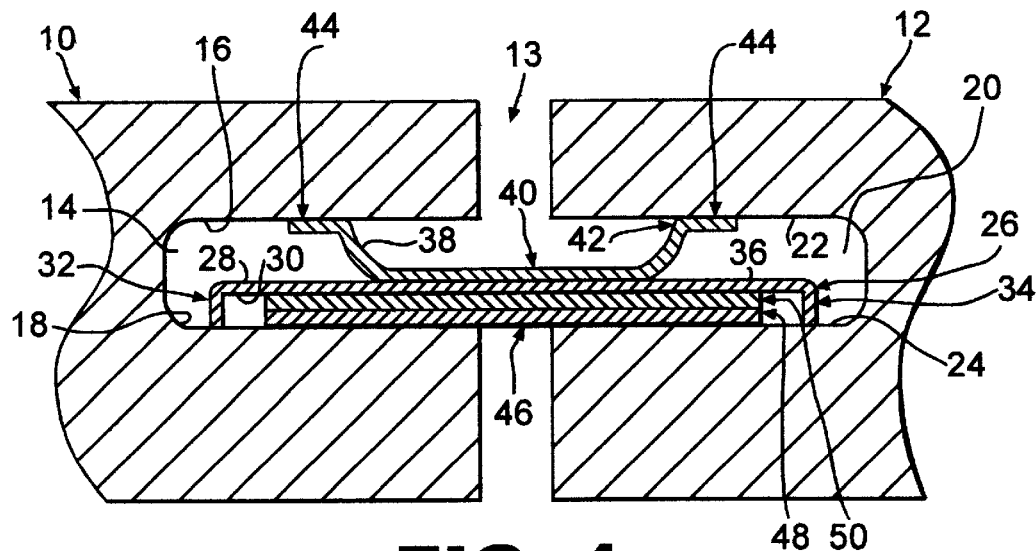
FIG. 1 is a cross-sectional view of a first embodiment of the seal assembly of the present invention.

The embodiments of the present invention provide a gas-path leakage seal for use in a turbine system. FIG. 1 is directed to a first embodiment of the present invention. Shown are a first and a second turbine member 10, 12. The first and second turbine members 10, 12 may be two separate turbine components, for example, adjacent turbine vanes or adjacent turbine ring segments. Alternatively, the first and second turbine members 10, 12 may actually be two sections of the same part. Regardless, the first and second 10, 12 turbine members are spaced apart so as to define a gap or gas leakage path 13.

The first turbine member 10 has a first recess 14 comprising at least a top surface 16 and a bottom surface 18. Similarly, the second turbine member 12 has a second recess 20 comprising at least a top surface 22 and a bottom surface 24. It should be noted that usage of relative terms like "top" and "bottom," here and throughout this application, are meant to guide the reader, and not to limit the scope of the invention. The first and second recesses 14, 20 are substantially aligned with each other for receiving the gas-path leakage seal assembly of the present invention.

One component of the gas-path leakage seal assembly of the present invention is a shim 26. The shim 26 provides the main sealing surface of the seal assembly. The shim 26 can be made of metal, and a preferred metal includes a cobalt-based superalloy. The shim 26 is generally planar and has a top side 28 and a bottom side 30. Overall, the configuration of the shim 26 can be described as having three main portions: a first end portion 32, a second end portion 34, and a bridge portion 36 connecting the first and second end portions 32, 34. As shown in FIG. 1, the bridge portion 36 is substantially planar. The end portions, such as legs 32, 34, originate at the ends of the bridge portion 36 and turn downward at 90 degrees, extending downward beyond the thickness of the bridge portion 36. The shim 26 may have additional features depending in part on the manner in which other components of the seal assembly cooperate with the shim 26. These additional features are described more fully below.

As shown in FIG. 1, the first embodiment of the seal assembly of the present invention also comprises a top spring 38. The purpose of the spring 38 is to constantly urge the shim 26 into contact with the turbine members 10, 12 and, more particularly, with the bottom surfaces 18, 24 of the recesses 14, 20 in the turbine members 10, 12. The top spring 38 may be a leaf spring, constructed from a sheet of spring steel or a wear resistant material, that is generally parabolic in cross-section having a vertex end 40 and base end 42. The base end 42 includes two flanges 44. Preferably, the thickness of the spring 38 is greater than the thickness of the shim 26. Under non-operational conditions, the flanges 44 are preferably substantially co-planar with respect to one another, but the flanges 44 can be at different relative elevations to accommodate the surfaces that each flange 44 engages. As for the vertex end 40, the spring 38 may be generally parabolic culminating at a vertex, defining a single line or region of contact, or the spring 38 may have another cross-sectional profile such that there are multiple points or areas of contact. The curvature of the spring 38 is preferably relatively steep near the ends, transitioning into a substantially flat region so as to increase the stiffness of the spring 38 and reduce the profile of the seal assembly as inserted into the recesses 14, 20. Preferably, the spring cross sectional profile is substantially flat over at least half of the curve length.

The shim 26 is relatively thin, typically ranging in thickness from about 10 mils to about 50 mils, and more preferably from about 10 mils to about 30 mils. Due to its thickness, the shim 26 is flexible; however, the shim 26 is not very durable and may fracture if exposed to bending or torquing forces.

Accordingly, another component of the seal assembly of the present invention is shim protection material 46. Not only may the shim protection material 46 provide a more durable wear surface to contact the turbine components 10, 12, but the shim protection material 46 may also provide secondary leakage resistance. The shim protection material 46 preferably includes flexible interwoven fibers that can be made of metals, composites, ceramics or some combination of the three. The preferred material is metal.

Figure 3:
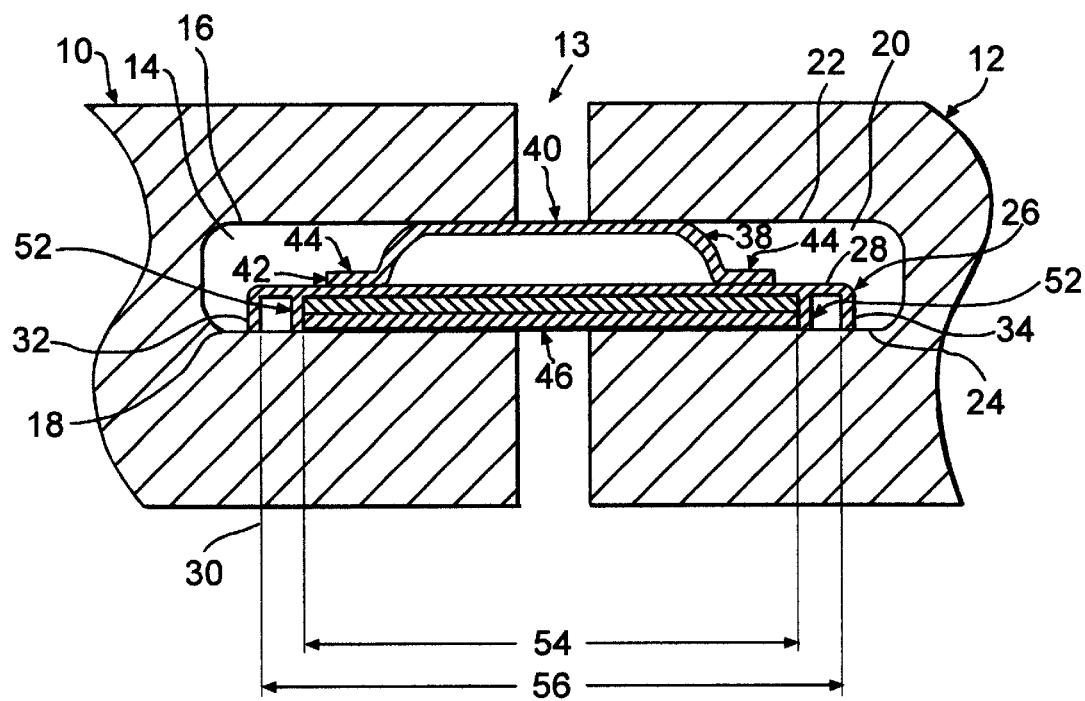
FIG. 3 is a cross-sectional view of a third embodiment of the seal assembly of the present invention.
Figure 2:
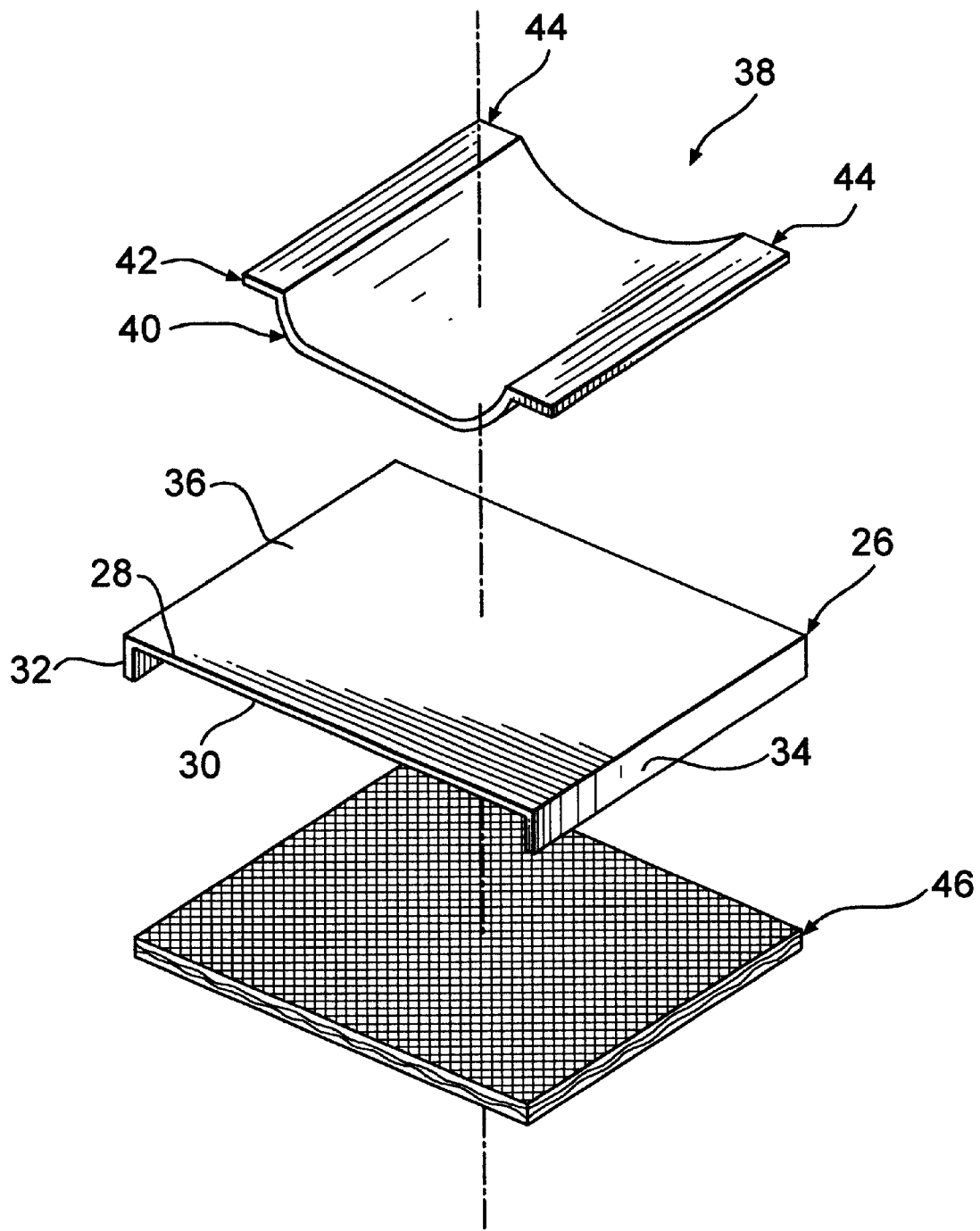
FIG. 2 is an exploded perspective view of a second embodiment of the seal assembly of the present invention.

The shim protection material 46 may include a single layer as shown in FIG. 2, or the shim protection material 46 may include multiple layers as shown in FIGS. 1 and 3. In the case of a single layer, it is generally preferred that the fibers are oriented in a single direction, preferably 45 degrees with respect to the longitudinal direction of the shim 26. In the case of multiple layers, it is preferred that, between layers, the fibers are alternatingly oriented. For example, the fibers of a first layer 48 may be oriented at 45 degrees whereas the fibers of an adjacent layer 50 would be oriented at 135 degrees. Moreover, the material compositions of each of the two layers can be identical or they can be different relative to one another. The shim protection material 46 can be anything so long as it protects the shim from contacting the turbine members, provides a more durable wear surface, provides secondary leakage resistance, and can withstand the operational environment of a gas turbine.

The shim protection material 46 is generally disposed adjacent to the bottom side 30 of the shim 26 between the two legs 32, 34 of the shim 26. This placement ensures that most of the bottom side 30 of the shim 26 will be prevented from contacting the turbine members 10, 12. The shim protection material 46 is secured to the shim 26 in a number of ways. First, as in FIG. 1, the material 46, such as a series of woven clothes, can be secured directly to the shim 26, for example, by spot welds (not shown).

In a second manner of attachment, as shown in FIG. 2, the shim protection material 46 is sufficiently long to extend between the end portions or legs 32, 34 of the shim 26 so as to substantially abut the legs 32, 34. Then, the shim protection material 46 is secured to each of the shim end portions 32, 34, preferably by seam welds (not shown).

Alternatively, for a more secure connection, the shim 46 may be provided with two rails 52 extending downwardly from the bottom side 30 of the bridge portion 36 of the shim 26, as shown in FIG. 3. The rails 52 are spaced inward from the first and second end leg portions 32, 34. As a result, a first distance 54 is defined between the rails 52. This first distance 54 is shorter than a second distance 56 defined between the first and second end portions 32, 34 of the shim 26. When rails 52 are provided, the shim protection material 46 will be sufficiently long to extend between and in substantial abutment with the rails 52. After the shim protection 46 material is in place, the shim protection material 46 is secured, for example by seam welding, to each of the rails 52.

The components of the above described embodiments of the seal assembly of the present invention may be assembled in the following manner. After identifying a gas-leakage path 13 between two turbine members 10, 12, recesses 14, 20 are added in the turbine members 10, 12, if they are not provided already. The shim protection material 46 is secured to the bottom side 30 of the shim 26 in the manner described above. The shim 26 and shim protection material 46 are then placed into the recesses 14, 20 of the turbine members 10, 12.

Once in place, the first and second end leg portions 32, 34 of the shim 26 engage the respective bottom surfaces 18, 24 of the recesses 14, 20. In addition, the shim protection material 46 engages or at least is substantially adjacent to the bottom surfaces 18, 24 of the recesses 14, 20 in the turbine members 10, 12. Next, the top spring 38 is slid into the recesses 14, 20 between the top surfaces 16, 22 of the recesses 14, 20 and the top surface of the shim 28. When in position, the vertex end 40 of the spring 38 operatively acts against the top surface 28 of the bridge portion 36 of the shim 26, and the flanges 44 of the base portion 42 of the spring 38 operatively act against the top surfaces 16, 22 of the recesses 14, 20 in the turbine members 10, 12. The spring 38 is outwardly biased so that the shim 26 and shim protection material 46 are urged downward against the bottom surfaces 18, 24 of the recesses 14, 20 in the turbine members 10, 12.

FIG. 3 shows an embodiment of the gas-path leakage seal in which the spring 38 is in an alternative orientation. Specifically, the spring 38 is inverted such that the vertex end 40 and a surrounding area of the vertex end 40 acts against the top surfaces 16, 22 of the recesses 14, 20 in the turbine components 10, 12 and into the gap 13 as well. At the other end, the flanges 44 of the base portion 42 act against the top side 28 of the shim 26. Though the engaging surfaces and load distribution are different, the manner of installing the spring 38 and the general operation of the spring 38 can be the same as described above. The inverted spring 38 can also be used in the embodiments of the seal assembly shown in FIGS. 1 and 2.

In addition to preventing gas path mixing, the seal assembly can accommodate misalignment of the turbine members 10, 12 due to thermal loads or vibration because the spring 38 is resilient enough to accommodate elevational variations. For example, if the first turbine member 10 is jolted such that the recesses 14, 20 no longer align vertically, then the top spring 38 can compensate for the changed conditions. The two flanges 44 of the base portion 42 of the spring 38 may be forced to sit at different elevations. In turn, the spring 38 may rock along its parabolic profile, but the spring 38 can nonetheless hold in place and continue to urge the shim 26 and shim protection material 46 downward. Moreover, on the bottom surfaces 18, 24 of the recesses 14, 20, the fibers comprising the shim protection material 46 are flexible enough so that the entire seal can conform to the various thermal and mechanical misalignments.

Figure 5:
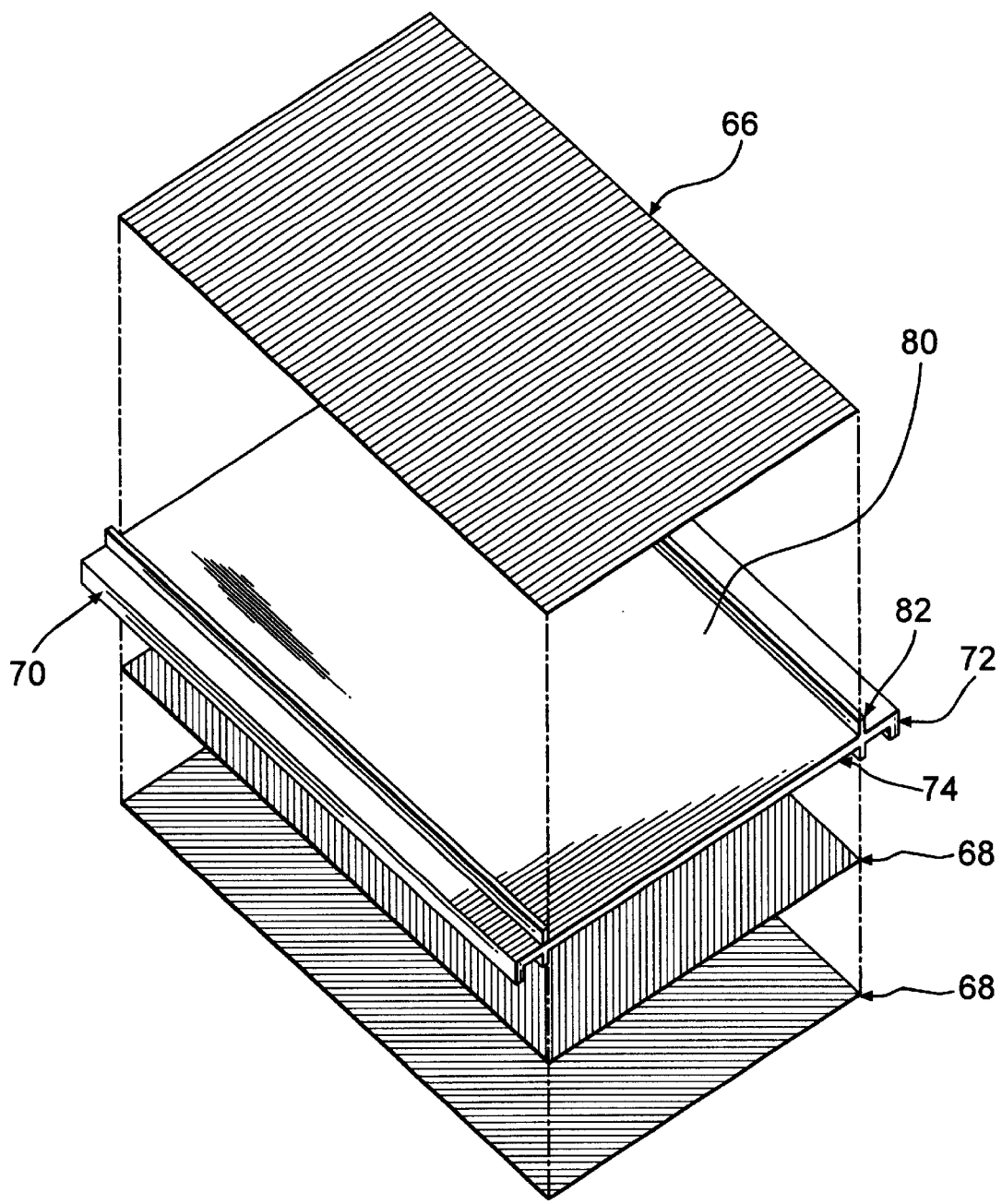
FIG. 5 is an exploded perspective view of a fifth embodiment of the seal assembly of the present invention.

FIGS. 4–6 are directed to additional embodiments of the shim assembly of the present invention. In each of these embodiments, a metal shim 60 is protected on its top and bottom sides 62, 64 by a first and second shim protection material 66, 68, respectively. The prior description of the metal shim 26 is applicable to this embodiment of the present invention; however, there is at least one variation that will be discussed below. Similarly, the previous discussion of the shim protection material 46, applies to both the first and second shim protection materials 66, 68 in these embodiments of the seal assembly of the present invention. Furthermore, first and second shim protection materials 66, 68 may comprise, with respect to one another, an identical number of layers as shown in FIGS. 4 and 6, or they may comprise a different number of layers as shown in FIG. 5.

The second shim protection material 68 is secured to the bottom side of the shim in some of the ways described before. As shown in FIG. 6, the second shim protection 68 material 68 may be sufficiently long to extend between the end portions or legs 70, 72 of the shim 60 so as to substantially abut the legs 70, 72. Then, the second shim protection material 68 is secured to the shim end portions 70, 72, preferably by seam welds.

Another manner of attaching the second shim protection material 68 to the shim 60 involves providing two rails 74 extending downwardly from the bottom side 64 of the bridge portion 76 of the shim 60, as shown in FIGS. 4 and 5. The rails 74 are spaced inward from the first and second end portions 70, 72. As a result, the rails 74 are spaced a linear distance 78 that is shorter than a linear distance 80 defined between the first and second end portions 70, 72 of the shim 60. When rails 74 are provided, the second shim protection material 68 will be sufficiently long to extend between and in substantial abutment with the rails 74. Once the second shim protection material 68 is place, the second shim protection material 68 is secured to the rails 74, preferably by seam welds.

As for the first shim protection material 66, two rails 82 extend upwardly from the top side 62 of the bridge portion 76 of the shim 60, as shown in FIGS. 4–6. The rails 82 are spaced inward from the ends of the bridge portion 76 of the shim 60. When the rails 82 are provided, the first shim protection material 66 will be sufficiently long to extend between and in substantial abutment with the rails 82. Once in place, the first shim protection material 66 is secured to the rails 82, preferably by seam welds 84 (see FIG. 6).

When assembling the second embodiment of the present invention, the second shim protection material 68 is secured to the shim 60 in one of the manners described above. Next, the first shim protection material 66 is secured to the shim 60 as described above. This order of attachment may be reversed with the first shim protection material 66 being attached first, followed by attachment of the second shim protection material 66. Then, the seal assembly is placed into the recesses 86, 88 in the turbine members 90, 92.

It will of course be understood that the invention is not limited to the specific details described herein, which are given by way of example only, and that various modifications and alterations are possible within the scope of the invention as defined in the appended claims.

What is claimed is:

1. An apparatus for minimizing gas-leakage comprising:
   a sealing shim having a top surface and a bottom surface, a first end portion, a second end portion, and a generally planar bridge portion connecting said first end portion and said second end portion, said first and second end portions extending downward at approximately 90 degrees from said bridge portion;
   at least one spring, wherein a portion of said spring operatively contacts said bridge portion of said top surface of said sealing shim; and
   shim protection material disposed generally between said first and second end portions and substantially adjacent to least a portion of said bottom surface of said bridge portion of said sealing shim, said shim protection material being secured to said shim.

2. The apparatus of claim 1, wherein said shim protection material substantially abuts said first and second end portions, said shim protection material being secured to said first and second end portions by seam welds.

3. The apparatus of claim 1, wherein said shim further includes a pair of rails extending downward from the bottom surface of the shim bridge portion, said shim protection material extending between and substantially adjacent to said pair of rails, said shim protection material being secured to said pair of rails by seam welds.

4. The apparatus of claim 1, wherein said shim protection material comprises flexible interwoven fibers.

5. The apparatus of claim 1, wherein said spring is a leaf spring having a curved cross-sectional profile, said profile defining a vertex portion extending to opposing base portions, said profile having a substantially flat region over at least half the cross sectional length and curving to the base portions.

6. A system for minimizing gas-leakage comprising:
   a first structure having a recess, said first recess comprising a top surface and a bottom surface;
   a second structure having a recess, said second recess comprising a top surface and a bottom surface, said first recess being in substantial alignment with said second recess;

a shim having top and bottom sides, first and second end legs, and a generally planar bridge portion connecting said first and second end legs, wherein said first end leg contacts said bottom surface of said first recess and wherein said second end leg contacts said bottom surface of said second recess;

a sheet of woven fibers disposed between said shim bottom side and said bottom surfaces of said first and second recesses, said sheet of woven fibers being secured to said shim;

a spring operatively positioned between said bridge portion of said shim top side and said top surfaces of said first and second recesses.

7. The system of claim 6, wherein said first and second structures are adjacent turbine vanes.

8. The system of claim 6, wherein said first and second structures are adjacent turbine ring segments.

9. The system of claim 6, wherein said spring is generally parabolic having a vertex end and a base end.

10. The system of claim 9, wherein said spring is positioned such that said vertex end contacts said bridge portion of said shim top side and said base end contacts said top surfaces of said first and second recesses.

11. The system of claim 9, wherein said spring is positioned such that said base end contacts said shim top side and said vertex end contacts said top surfaces of said first and second recesses.

12. The system of claim 6, wherein said sheet of woven fibers having a single layer.

13. The system of claim 6, wherein said sheet of woven fibers having at least two layers.

14. The system of claim 6, wherein said sheet of woven fibers contacts extends between said first and second end legs such that said sheet substantially abuts said first and second end legs, said sheet being secured to said first and second ends.

15. The system of claim 6, wherein said shim includes a pair of downwardly extending rails extending from the bottom surface of the shim bridge portion, said sheet of woven fibers being disposed between and substantially abutting said pair of rails, said sheet being secured to said rails by seam welds.

16. A system for minimizing gas-leakage comprising:

a sealing shim having top and bottom surfaces, a first end leg, a second end leg and a generally planar bridge portion connecting said first and second end legs, said end legs extending downward from said bridge portion at about 90 degrees;

said shim further having a pair of top rails extending upwardly from said bridge portion of said top side of said shim;

a first shim protection material extending between and secured to said pair of top rails;

a second shim protection material disposed between said first and second end legs and substantially adjacent to least a portion of said bridge portion of said shim bottom surface, said second shim protection material being secured to said shim.

17. The system of claim 16, wherein said second shim protection material substantially abuts and is secured to said first and second end legs.

18. The system of claim 16, wherein said shim further includes bottom rails extending downward from said bridge portion of said shim bottom surface at about 90 degrees, said bottom rails being spaced inward from said first and second end legs, said second shim protection material extending between and substantially adjacent to said bottom rails, said shim protection material being secured to said bottom rails by seam welds.

* * * * *